Patented Aug. 19, 1924.

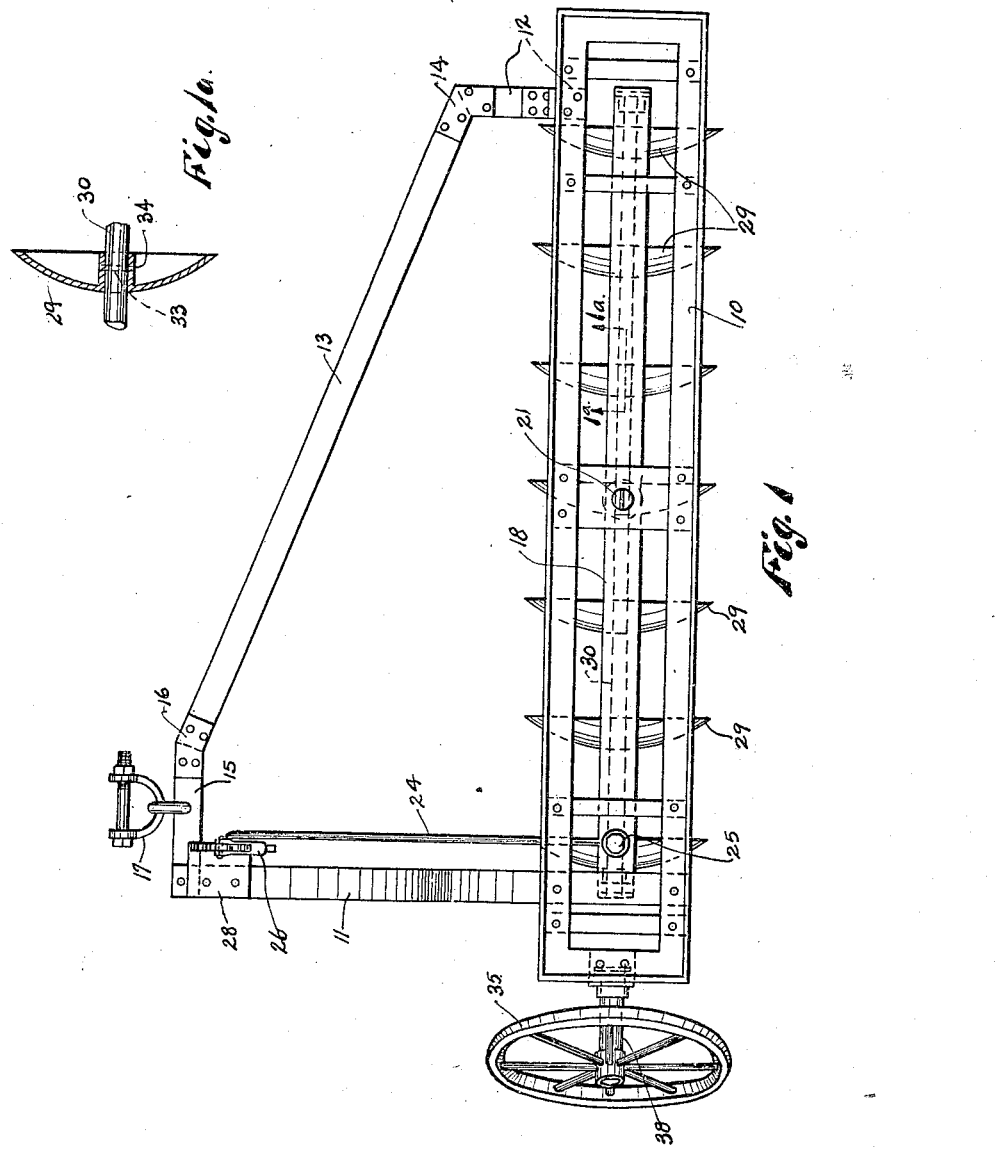

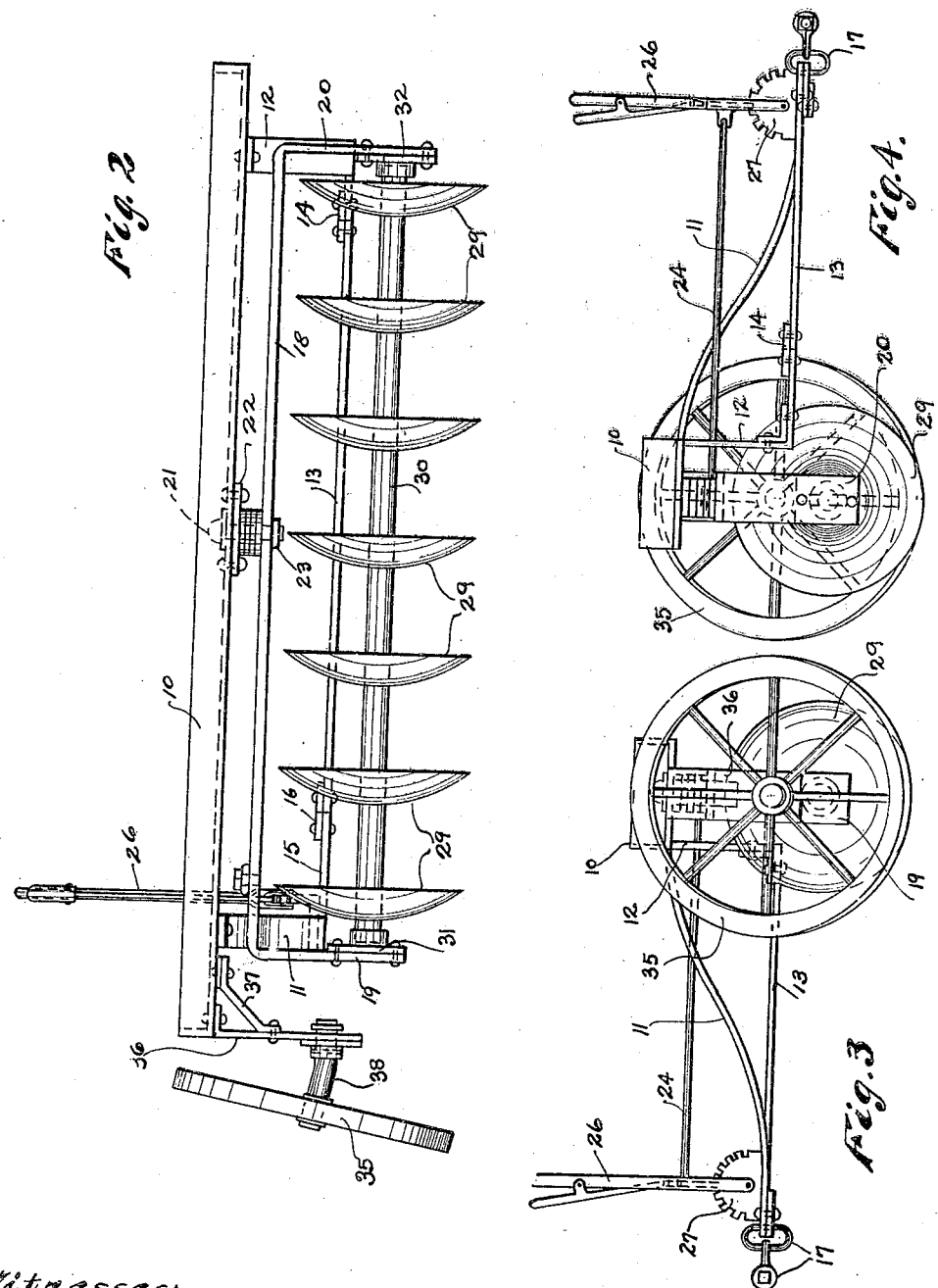

1,505,588

UNITED STATES PATENT OFFICE.

JAMES M. CROSBY, OF MOMENCE, ILLINOIS.

DISK HARROW.

Application filed October 18, 1920. Serial No. 417,692.

*To all whom it may concern:*

Be it known that I, JAMES M. CROSBY, a citizen of the United States, and a resident of the city of Momence, county of Kankakee, and State of Illinois, have invented certain new and useful Improvements in Disk Harrows, of which the following is a specification.

My invention relates to improvements in disk harrows of a type for use behind a plow for accomplishing the plowing and the discing of the ground at a single operation, thus preventing baking of the surface and it has for its primary object the provision of an offset harrow, said harrow being held in offset position by reason of the triangular arrangement of the frame and the location of a furrow wheel.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of the harrow.

Fig. 1ª is a vertical section through one of the disks, being taken substantially on line 1ª—1ª of Fig. 1.

Fig. 2 is a rear view of the harrow.

Fig. 3 is a side view of the harrow as seen from the left in Fig. 1, and

Fig. 4 is a side view of the harrow as seen from the right in said Fig. 1.

Referring to the drawings, 10 indicates a weight box of any approved construction of sufficient strength to form the transverse rear bar of a triangular frame work as hereinafter described. A side bar extends underneath one end of the weight box 10 and is rigidly secured thereto, being given a downward inclination from the weight box as it extends forwardly therefrom, as is best shown in Fig. 3. A heavy bracket 12 is secured to the opposite end portion of the weight box 10 and extending downwardly therefrom, being turned to extend directly forward at a short distance below the end of the box 10. A diagonally disposed bar 13 is connected by means of a corner plate 14 with the forward end of the horizontal bar portion of the bracket 12. The bars 11 and 13 are connected together at their forward ends by means of a short cross-bar 15, as is best shown in Fig. 1, the connection between the bars 13 and 15 being effected by means of a corner plate 16. A clevis 17, of any approved type, is mounted upon the cross-bar 15, being positioned substantially at the left-hand side of the machine as seen in Fig. 1.

A gang of disks is mounted beneath the weight box 10 so as to be adjustable horizontally with respect to said box. In the construction shown, this adjustable mounting is effected by means of a frame comprising a cross-bar 18 and downwardly extending arms 19 and 20, such arms in the construction shown being formed integrally with the bar 18. The bar 18 is pivotally mounted underneath the weight box 10 by means of a vertical pivot pin 21 which passes through the said bar 18 and through a heavy plate 22 secured to the box 10. A nut 23, secured upon the lower end of the pin 21 by means of screw threads, serves to hold the parts securely together. Further connection between the frame work and the bar 18 is effected by the use of a link 24 which is pivotally connected by means of a bolt 25 to one end portion of the bar 18, the forward end of the link 24 being pivotally connected to a hand lever 26 which is pivotally mounted upon a toothed segment 27 carried by a plate 28 secured to the forward end of the bar 11. Suitable latch mechanism of any approved type is provided for holding the lever 26 in adjusted position with respect to the segment 27.

A plurality of disks 29, of any approved type, are revolubly secured between the arms 19 and 20 by means of a shaft 30 which is supported at its ends, between the arms 19 and 20, by means of socketed plates 31 and 32 carried respectively by the arms 19 and 20. In the construction shown, the disks 29 are secured upon the shaft 30 by means of pins 33 passing through the shaft and through hubs 34 carried by the disks, as is best shown in Fig. 1ª.

A carrying wheel 35 is mounted upon the frame work of the machine at one side—at the side toward which the pressure of the disks in the ground tends to throw the frame in the operation of the machine. This wheel 35 is mounted in position by means of a bracket 36 secured to the end portion of the weight box 10 being braced in position by means of a triangularly disposed brace bar 37. The wheel is mounted in position by means of an axle member 38 of any approved type, the axle member 38 being preferably inclined slightly from the horizontal so as to cause the wheel 35 to stand in slightly canted position with respect to the frame work as is best shown in Fig. 2.

In operation the harrow is connected in position behind the plow by the use of the clevis 17 so as to be drawn forward thereby with the wheel 35 running in the dead furrow. With the gang of disks in transverse position, as shown in Fig. 1, the disks will exert only a slight pressure laterally and will not have a very great efficiency for stirring the soil. Upon a proper adjustment of the gang about the pivot pin 21 by the use of the lever 26, however, the disks are caused to cut deeper into the ground, with a correspondingly heavier lateral thrust. The disposition of the wheel 35 is such that it is adapted to resist any tendency of the harrow to crawl sidewise out of normal position by reason of the lateral thrust of the disks.

The lever 26 can also be used for changing the position of the gang of disks with respect to the frame work for assisting in the turning operation at the end of a furrow and for guiding the disk into proper position with respect to the furrow.

By the use of my improved harrow following the plow when the ground is being turned, the soil is sufficiently pulverized for preventing baking, and in this way the soil is kept in good condition for planting and cultivation.

While I have illustrated and described the preferred form of construction for carrying my invention into effect, this is capable of variation and modification without departing from the spirit of invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. An implement of the class described comprising a triangular frame; a shaft revolubly mounted in transverse position below said frame and extending across same; disks on said shaft; and a supporting wheel revolubly mounted in inclined position at one side of said frame for resisting the lateral thrust of said disks, substantially as described.

2. An implement of the class described comprising a frame; a weight box mounted on said frame; an inclined wheel mounted on said frame; a bar pivotally mounted on the under side of the weight box; arms depending from said bar; a rotatable shaft mounted between said arms; disks mounted on said shaft; and means for adjusting said shaft and disks horizontally with respect to said weight box, substantially as described.

3. An implement of the class described comprising a triangularly shaped frame; a clevis attached to the apex of said frame; a weight box mounted on said frame; an inclined wheel mounted opposite one end of said weight box; a bar pivotally mounted on the under side of said weight box; arms depending from said bar; a rotatable shaft mounted between said arms; disks mounted on said rotatable shaft; an adjustable lever arm mounted on the frame; and a link connecting said lever arm to one end of the pivotally mounted bar, substantially as described.

4. A harrow comprising a frame; a transversely-disposed shaft mounted on said frame; disks revolvably mounted on said shaft; and a clevis at one side of the frame substantially directly in front of one end of said shaft adapted by itself to connect the harrow in offset position to a machine in front, substantially as described.

5. A harrow comprising a frame; a transverse shaft mounted on said frame; disks mounted on said shaft; a wheel revolubly mounted on said frame at one side thereof; and a clevis connected to said frame adjacent to the side thereof at which said wheel is mounted, substantially as described.

6. A harrow comprising a frame; an inclined wheel mounted on said frame at one side thereof; a cross bar pivotally mounted beneath said frame and extending throughout the length thereof; arms depending from said cross bar; a plurality of disks revolubly mounted between said arms; means engaging one end of said bar for adjusting same horizontally about its pivotal axis on said frame; and a clevis connected to said frame adjacent to the side thereof and in front of said disks at which said wheel is mounted, substantially as described.

In testimony whereof I have signed my name to this specification in the presence of two subscribing witnesses.

JAMES M. CROSBY.

Witnesses:
G. R. HESS,
IRENE GARRETT.